Nov. 7, 1933.  A. NAGEL ET AL  1,933,823
CUT FILM AND PLATE HOLDER
Filed Jan. 20, 1933    2 Sheets-Sheet 1
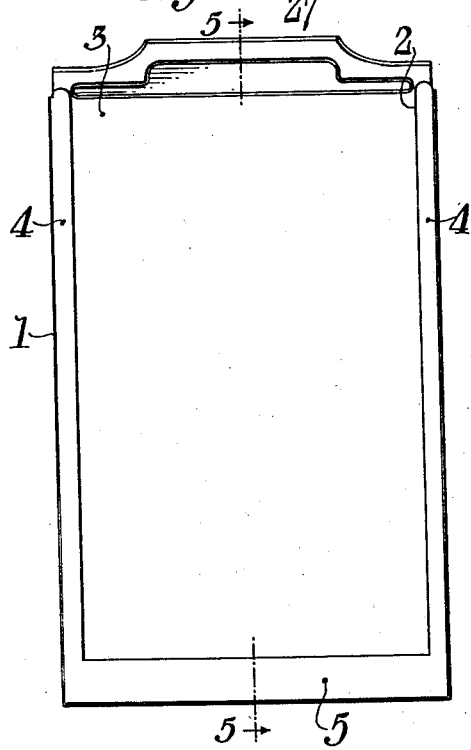
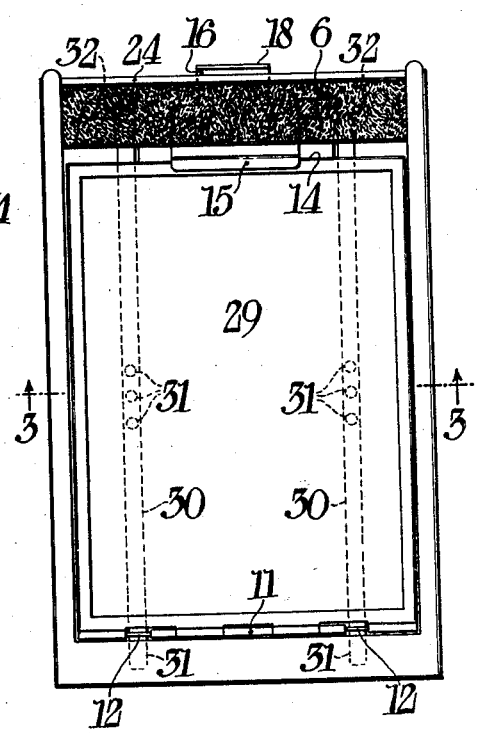
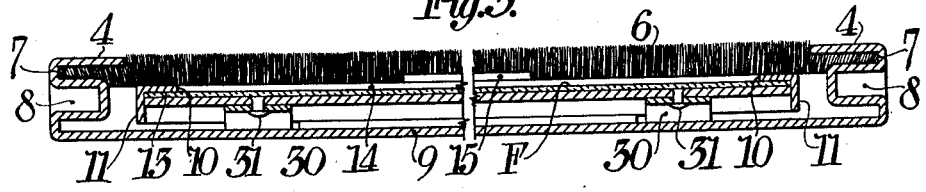
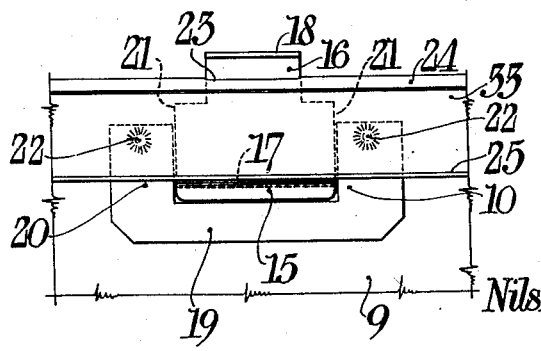
Inventors:
Nils Bouveng & August Nagel,
By Newton M. Perrins
Donald H. Stewart
Attorneys

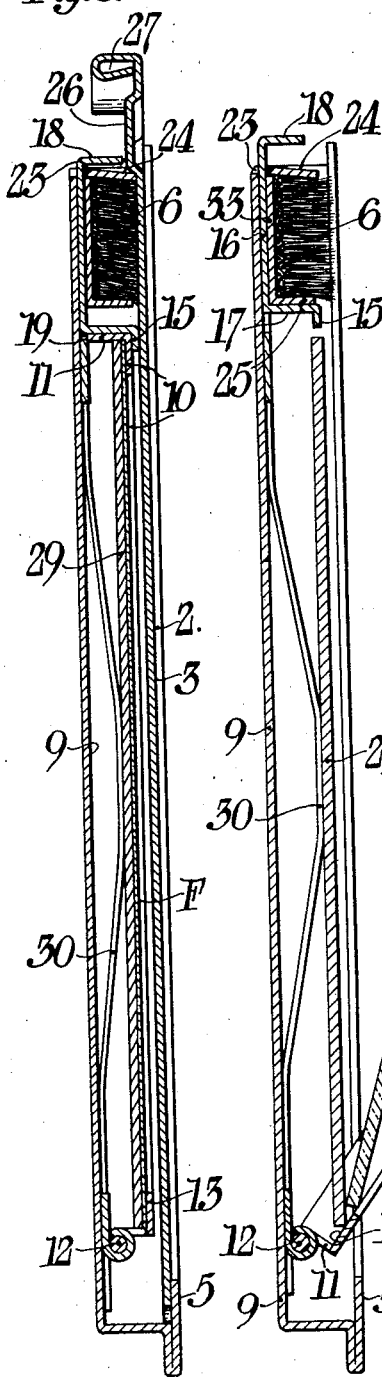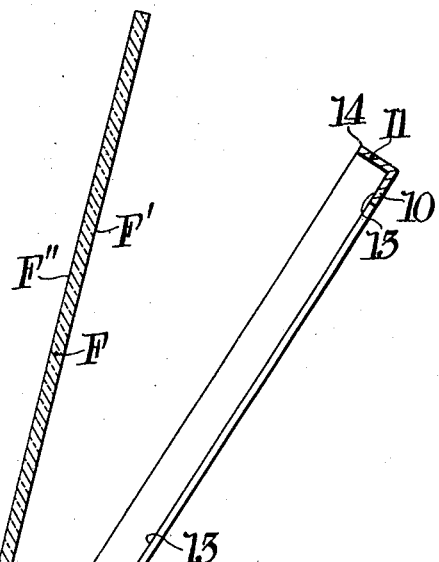

Patented Nov. 7, 1933

1,933,823

UNITED STATES PATENT OFFICE 1,933,823

CUT FILM AND PLATE-HOLDER

August Nagel, Stuttgart, Germany, and Nils Bouveng, Elga, Satsjabaden, Sweden, assignors to Eastman Kodak Company, Rochester, N. Y., a corporation of New York Application January 20, 1933, Serial No. 652,714, and in Germany August 25, 1932

7 Claims. (Cl. 95—66)

This invention relates to photography and more particularly to holders for sheets of sensitized material for photographic cameras. One object of our invention is to provide a plate-holder which is small, thin, light in weight and easily loaded and unloaded. Another object of our invention is to provide a holder in which sheets of sensitized material may be held flat in a focal plane. Another object of our invention is to provide a holder which will hold a sensitized surface flat and in the focal plane regardless of the thickness of the base on which the sensitized material is coated and regardless of whether or not the base is flexible. Another object of our invention is to provide a holder for sheets of sensitized material in which the stiff or flexible sheets can be easily loaded and unloaded into the holder. Another object of our invention is to provide a holder in which the means for loading the sensitized sheets can only be operated when the dark slide is removed from the holder. Another object of our invention is to provide a holder in which a frame defines the focal plane and in which a flat presser member resiliently presses forwardly toward the frame to hold a sheet of sensitized material flat thereon. Still another object of our invention is to provide a holder in which the sensitized sheet holding means is hingedly connected to the frame and the presser member is resiliently mounted on the frame in parallel relation therewith and other objects will appear from the following specification, the novel features being particularly pointed out in the claims at the end thereof.

Coming now to the drawings wherein like reference characters denote like parts throughout:

Fig. 1 is a front plan view of a plate-holder constructed in accordance with and embodying a preferred form of my invention;

Fig. 2 is a similar view of the plate-holder shown in Fig. 1 but with the dark slide removed;

Fig. 3 is an enlarged sectional view taken on the line 3—3 of Fig. 2;

Fig. 4 is an enlarged plan view of the latching device used in the plate-holder constructed in accordance with the preceding views with the plush light-locking material removed;

Fig. 5 is an enlarged detailed section taken on line 5—5 of Fig. 1; and

Fig. 6 is a view similar to Fig. 5 but with the dark slide removed and the parts in position to load the holder.

In the following specification and claims where we refer to "plate-holder" we intend this term to be used in its generic sense in which it includes a holder for a photographic sensitive material coated on glass, on a cellulosic base or on paper.

In accordance with our invention the plate-holder may consist of a body portion designated broadly as 1 having an opening 2 which may be covered by means of a dark slide 3. The opening 2 is bounded on the sides by the flanges 4 and on the bottom by the flange 5. Along the top edge plush 6 forms the fourth side of the frame. This plus is adapted to resiliently press on the dark slide 3 when the latter is moved to close the aperture 2 by passing the dark slide through the grooves 7 lying beneath the flanges 4 on each side of the plate-holder and beneath the botom flange 5.

The sides of the plate-holder have a forming to provide grooves 8 which engage cooperating parts on a camera body. The rear wall of the holder consists of a flat plate 9. In order to hold sheets of sensitized material such as film F which as above explained may be a sensitized emulsion coated on glass, cellulosic material or paper, we provide a hinged frame 10. This frame has four sides L-shaped in cross section as best shown in Fig. 6. The top frame 10, in other words, is provided with a downwardly extending flange 11 to form a shallow box-like receptacle for the cellulosic material. The frame 10 is hinged at the bottom 11 to a pintle 12 carried by the wall 9 of the plate-holder.

The hinge 11 is accurately formed so that the inner edge 13 of the frame member may be accurately spaced in the focal plane of the camera with which the plate-holder is adapted to cooperate. The upper end 14 of the frame 10 is accurately positioned by means of a latch member having a formed-up lip 15 adapted to define the position of the end 14 of the frame 10.

As best shown in Figs. 4, 5 and 6 this latch member includes the lip 15 carried on the end of a slidable member 16 formed upwardly at 17 to carry the lip 15 and formed upwardly at 17 to form a handle by which the member 16 may be moved. As indicated in Fig. 4 the movement of the slidable member 16 is guided by means of a plate 19 having arms 20 which form guideways for the sides 21 of the slidable member. The guide 19 may be attached to the base 9 in any suitable manner as, for instance, by spot welding as indicated at 22. The part 16 passes through a cut-out 23 in the upper wall 24 of the plate-holder, this upper wall defining the upper edge of the plush 6. The lower edge of the plush is defined by a wall 25.

When the dark slide 3 is inserted to cover the opening 2 the plush presses against the dark slide and makes a light-tight connection therewith. When the plate-holder lies against a camera the plush makes a light-tight connection with the camera in a well known manner.

As is obvious from Fig. 5 and Fig. 6 when the handle is in its latching position so that the lip 15 will engage and hold the upper edge 14 of the frame 10 in place the frame will be securely latched in position with the flange 11 in contact with the plate 19. From Fig. 5 it will be noted than since the flange 18 extends up to the forming 26 of the dark slide, it cannot be reached by the hand of an operator while the dark slide is in place.

However, when the handle 27 is used to withdraw the dark slide from the holder this renders the handle 18 of the latch member accessible and it may be drawn out to the position shown in Fig. 6 in which the frame 10 is released.

When released the frame is thrust outwardly toward the position shown in Fig. 6 by means of the flat plate 29 which is pressed outwardly by means of the springs 30. As shown in Fig. 2 these springs may be attached near their center point in any suitable means as by spot welding or riveting at 31. One or more spot welds or rivets may be used to attach these frames.

As also shown in this figure the ends of these springs 31 and 32 retain the plate 29 in position in the following manner: The ends 31 pass beneath the hinged pintle 12 and the ends 32 pass beneath the plate 33 which forms the bottom member for supporting the plush 6. Thus while these springs are free to thrust the flat plate 29 outwardly a limited distance with respect to the flat plate 9 they prevent the plate 29 from springing away from the plate-holder and thus become disconnected from it.

Since the plate 29 is spring pressed outwardly when the latch member 18 moves the lip 15 from the end 14 of the frame 10, it springs outwardly to receive or release a photographic film F.

It is, of course, understood that the photographic film F is of the usual type in which the side F' supports an extremely thin layer of photographically sensitive emulsion.

The operation of our plate-holder is as follows: The handle 27 of the dark slide is used to remove the dark slide from the opening 2. With the holder as shown in Fig. 2 the handle 18 is used to move the slide 16 outwardly until the lip 15 releases edge 14 of the frame 10.

The spring pressed plate 29 under the impulse of the springs 30 thrust the frame 10 outwardly swinging it about its pintle 12. When the frame is in the position shown in Fig. 6 or perhaps a distance on either side of this position the frame 10 forms a hollow box-like receptacle to receive a sheet of film F with the sensitized emulsion F' lying towards the inner edge 13 of the frame which forms the focal plane when the frame is in a closed position. By swinging the frame about its pintle 12 after the film has been inserted the rear surface F'' of the film is brought into contact with the flat plate 29 and as the frame is moved to its operative or picture-taking position the plate 29 moves rearwardly until it reaches the position shown in Fig. 5 in which the top 14 of the frame can be engaged by the lip 15 of the latch.

It should be noted that the plate 29 constantly exerts an outward thrust upon the film F holding it against the entire inner edge 13 of the frame 10. This action takes place regardless of the thickness of the base F of the film so that the plate-holder accurately cares for sensitized material carried by thick or thin glass, a pyroxylin base of any of the commercial thicknesses and various thicknesses of paper or cards. In any case the sensitized emulsion side F' lies in the proper focal plane which is, of course, defined by the inner edge 13 of the frame 10.

The dark slide by means of handle 27 is inserted to cover an exposure opening as shown in Fig. 1 and the plate-holder is ready for use.

It should be noted that this plate-holder, while shown on a greatly enlarged scale in the drawings, insofar as the thickness of the metal goes, is of compact size, light in weight and can be easily and quickly operated in the dark if necessary since the parts for operating the loading and unloading of the holder are simple in construction and easily moved. This is a distinct advantage particularly with the new highly sensitized super-speed films now on the market.

While we have illustrated a preferred embodiment of our invention, it is obvious that certain modifications and changes can be made from the construction which we have illustrated so that we contemplate as with the scope of our invention all such changes as may come within the scope of the appended claims.

What we claim as new and desire to be secured by Letters Patent of the United States is:

1. In a cassette for holding sheets of sensitized material for exposure, the combination with a light tight casing having an exposure opening in one side, of a dark slide adapted to form a light tight closure for the opening, a flat member carried by the cassette, springs normally thrusting said flat plate from the cassette, and a frame carried by the cassette for defining the focal plane in the cassette adapted to receive said spring pressed flat plate and to limit its movement with respect to said cassette.

2. In a cassette for holding sheets of sensitized material for exposure, the combination with a light tight casing having an exposure opening in one side, of a dark slide adapted to form a light tight closure for the opening, a flat member carried by the cassette, springs normally thrusting said flat plate from the cassette, and a frame carried by the cassette for defining the focal plane in the cassette adapted to receive said spring pressed flat plate and to limit its movement with respect to said cassette, said frame being movably mounted in said cassette, and means for positioning said frame in a predetermined position inside of said cassette.

3. In a cassette for holding sheets of sensitized material for exposure, the combination with a light tight casing having an exposure opening in one side, of a dark slide adapted to form a light tight closure for the opening, a flat member carried by the cassette, springs normally thrusting said flat plate from the cassette, and a frame carried by the cassette for defining the focal plane in the cassette adapted to receive said spring pressed flat plate and to limit its movement with respect to said cassette, said frame being hingedly mounted in said cassette, a latch for restraining the frame from moving in said cassette, said latch and said hinge fixing the location of the frame with respect to said cassette.

4. In a cassette for holding sheets of sensitized material for exposure, the combination with a light tight casing having an exposure opening in one side, of a dark slide adapted to form a light tight closure for the opening, a flat member carried by the cassette, springs normally thrusting said flat plate from the cassette in a direction substantially parallel to the cassette, a focal plane defining frame, a hinge connecting one end to the cassette and defining the position of one end of the frame relative to the cassette, a latch for engaging the frame and defining the position of the other end of the frame relative to the cassette, said latch being releasable to permit said frame to swing from the spring pressed plate to load a sheet of sensitive material therebetween.

5. In a cassette for holding sheets of sensitized material for exposure, the combination with a light tight casing having an exposure opening in one side, of a dark slide adapted to form a light tight closure for the opening, a flat member carried by the cassette, springs normally thrusting said flat plate from the cassette, in a direction substantially parallel to the cassette, a focal plane defining frame, having flanged sides adapted to embrace the edges of said spring pressed plate, means for positioning the flanged frame with respect to said cassette, said plate being adapted to resiliently press a sheet of sensitive material against said frame between the said flanges.

6. In a cassette for holding sheets of light sensitive material flat for exposure the combination with a light tight casing having an exposure opening in one side, of a dark slide adapted to close said opening, a focal plane defining frame mounted in said cassette, a plate spring pressed toward said frame and adapted to clamp a sheet of light sensitive material therebetween, connections between said frame, spring pressed plate and cassette whereby said frame may be moved from said plate for inserting and removing a light sensitive sheet.

7. In a cassette for holding sheets of light sensitive material flat for exposure the combination with a light tight casing having an exposure opening in one side, of a dark slide adapted to close said opening, a focal plane defining frame mounted in said cassette, a hinge connecting said frame to the cassette on one side, a latch adapted to engage and hold said frame in a predetermined position with respect to said frame on another side of said frame, said latch being slidably mounted on the cassette and having a handle extending to the outside of the cassette, said handle being so positioned with respect to the dark slide that said dark slide prevents the operation of said handle when said dark slide covers the exposure opening in the cassette.

AUGUST NAGEL.
NILS BOUVENG.